US006590870B1

(12) United States Patent
Mellberg (10) Patent No.: US 6,590,870 B1
(45) Date of Patent: Jul. 8, 2003

(54) TRANSMISSION OF ALTERNATING DELIMITER CODE TO ACHIEVE BYTE ALIGNMENT WHEN USING IN-BAND DIGITAL CODE SEQUENCES TO REMOTELY PROVISION NETWORK INTERFACE DEVICE TERMINATING LOCAL LOOP

(75) Inventor: Brian G. Mellberg, Madison, AL (US)

(73) Assignee: Adtran Inc., Huntsville, AL (US)

( * ) Notice: Subject to any disclaimer, the term of this patent is extended or adjusted under 35 U.S.C. 154(b) by 0 days.

(21) Appl. No.: 09/382,850

(22) Filed: Aug. 25, 1999

(51) Int. Cl.7 .......................... G01R 31/08; G06F 11/00; H04J 1/16; H04J 3/14; H04L 12/26
(52) U.S. Cl. ....................................... 370/249; 370/522
(58) Field of Search ................. 370/249, 384, 370/522, 426, 410, 377, 373; 340/7.43; 359/117; 709/224; 375/223

(56) References Cited

U.S. PATENT DOCUMENTS 4,282,400 A * 8/1981 Ribera et al. .................. 178/73
5,050,189 A * 9/1991 Cox et al. ..................... 375/223
5,278,823 A * 1/1994 Handel ......................... 370/249
5,390,179 A * 2/1995 Killian et al. ................ 370/249
5,574,723 A * 11/1996 Killian et al. ................ 370/384
5,687,013 A * 11/1997 Henmi ......................... 359/117
5,859,838 A * 1/1999 Soliman ....................... 370/249
5,905,448 A * 5/1999 Briancon et al. ............ 340/7.43
5,913,036 A * 6/1999 Brownmiller et al. ....... 709/224

* cited by examiner

Primary Examiner—Wellington Chin
Assistant Examiner—Jamal A. Fox
(74) Attorney, Agent, or Firm—Allen, Dyer, Doppelt Milbrath & Gilchrist, P.A.

(57) ABSTRACT

A control link establishment code sequence for interrogating a network element interface (NEI) device terminating a local digital data services loop of a telecommunications network has an in-band code exclusive of codes currently employed to represent functional operations to be executed by a channel unit. Once a virtual link is established, a command—response mode session is conducted. To provide for byte alignment over the local loop for remote provisioning protocol employed at various violation mode rates, each command—response code byte is repeatedly transmitted, and a 'delimiter' byte is interleaved with successively repeated ones of the same code byte. Response messages from the NEI device also have code repeats interleaved with the delimiter byte.

22 Claims, 4 Drawing Sheets

| MINIMUM # CODES | BYTE PATTERN | NETWORK BYTE |
|---|---|---|
| 40 | TIP | S0111010 |
| 40 | SELECT CODE | S1100001 |
| 120 | LBE | S1010110 |
| 40 | FEV | S1011010 |

```
<SOM><DELIMITER><SOM><DELIMITER> ........... <SOM><DELIMITER>
<CT><DELIMITER><CT><DELIMITER> ........... <CT><DELIMITER>
<DATA_N> <DELIMITER><DATA_N><DELIMITER> ........... <DATA_N><DELIMITER>
    ............    ............
<EOM><DELIMITER><EOM><DELIMITER> ........... <EOM><DELIMITER>
```

FIG. 5.

| BIT | 1 | 2 | 3 | 4 | 5 | 6 | 7 | 8 |
|---|---|---|---|---|---|---|---|---|
| DEFINITION | SF | NSB | C4 | C3 | C2 | C1 | C0 | 1 |

FIG. 6.

| BIT | 1 | 2 | 3 | 4 | 5 | 6 | 7 |
|---|---|---|---|---|---|---|---|
| 56k | 1 | NSB | C4 | C3 | C2 | C1 | C0 |

FIG. 7.

| BIT | 1 | 2 | 3 | 4 | 5 | 6 |
|---|---|---|---|---|---|---|
| SUBRATES | NSB | C4 | C3 | C2 | C1 | C0 |

FIG. 8.

| BIT | 1 | 2 | 3 | 4 | 5 | 6 | 7 | 8 |
|---|---|---|---|---|---|---|---|---|
| DEFINITION | SF | 1 | 1 | 1 | 1 | 0 | 0 | 1 |

FIG. 9.

| BIT | 1 | 2 | 3 | 4 | 5 | 6 | 7 |
|---|---|---|---|---|---|---|---|
| 56k | 1 | 1 | 1 | 1 | 1 | 0 | 0 |

FIG. 10.

| BIT | 1 | 2 | 3 | 4 | 5 | 6 |
|---|---|---|---|---|---|---|
| SUBRATES | 1 | 1 | 1 | 1 | 0 | 0 |

FIG. 11.

TRANSMISSION OF ALTERNATING DELIMITER CODE TO ACHIEVE BYTE ALIGNMENT WHEN USING IN-BAND DIGITAL CODE SEQUENCES TO REMOTELY PROVISION NETWORK INTERFACE DEVICE TERMINATING LOCAL LOOP

FIELD OF THE INVENTION

The present invention relates in general to telecommunication systems, and is particularly directed to a delimiter code insertion mechanism for achieving byte alignment during remote provisioning and interrogation of a network element interface (NEI) device, such as a digital data services termination (DDST) unit, by a test system controller. To establish a virtual communication path, the test system controller transmits a link establishment code sequence that contains a prescribed select code/byte, which is exclusive of those codes currently employed to represent functional operations to be executed by one or more channel units, so that the destination DDST is not prevented from receiving the link establishment code sequence. In particular, the replacement select code is defined so as to cause the link establishment message to be ignored by intermediate data port units, so that the link establishment message is conveyed all the way to the destination DDST.

BACKGROUND OF THE INVENTION

As described in the U.S. Patents to S. Killian et al, U.S. Pat. Nos. 5,390,179 and 5,574,723, entitled: "Remote Provisioning of Telephone Channel Unit Using Inband Digital Code Sequences Transmitted Over Tandem Link," assigned to the assignee of the present application and the disclosures of which are incorporated herein, one of the reasons that the telephone companies have been slow to convert to digital signalling subsystems, and incorporate digital communication schemes into their well established copper wire networks, has been the fact that a significant part (if not all) of their established telephone networks employ analog signalling equipment.

To be accepted by the telephone industry, digital products must not only be cost effective substitutes, but must be compatible with any remaining analog equipment. In order to satisfy these requirements, the assignee of the present application has offered and continues to supply various types of digital data port or channel units, that not only facilitate the replacement of conventional analog equipment with digital devices, that allow signalling, voice and data communications to be extended over a tandem communication link and a local loop to a customer premises, but do so without totally preempting the conventional use of analog signalling for maintenance and testing.

With these objectives in mind, the above-referenced Killian et al Patents describe a digitally implemented scheme that allows any channel unit tandemly distributed along a communication path to be selectively remotely accessed and provisioned by a test system controller. This remote access and provisioning mechanism involves a modification of their communication control software, and a modified set of in-band digital code sequences that are customarily used to establish a latching loopback condition.

To initiate a communication session with a selected channel unit, the test system controller transmits a 'control link establishment code sequence' comprised of predefined digital code bytes that are repeatedly transmitted along the link. The format of the control link establishment sequence is such that as it is forwarded along the link, any tandem channel unit or units intermediate the test system controller and the destination channel unit will transition to a transparent state. This communication transparency of the intermediate units allows a control link establishment code set within the overall control link establishment sequence, which will enable the destination channel unit to receive and respond to command messages from the test system controller, to propagate down the link to the destination channel unit, so that only the destination channel unit will be able transition to an interrogation, response mode.

Once it has acknowledged receipt of the control link establishment code set—indicating that a virtual point-to-point, command-response control link has been established with the test system controller—the selected or destination channel unit transitions to a command-response mode. During this command-response mode, any intermediate channel unit remain transparent, so that command and response messages propagate unmodified between the test unit controller and the destination channel unit.

A command message may contain information for defining the operational configuration of the selected channel unit. It may also be used to read the operational configuration or status of the selected channel unit, or it may contain supervisory control information for directing the selected channel unit to conform with a prescribed operational condition. It has been found that where the channel unit to be accessed is a network element interface (NEI) such as a digital data services termination (DDST) that terminates a local DDS loop, there is a potential problem in determining proper byte alignment for the remote provisioning protocol employed for various violation mode rates, including, for example, 56 Kbps (56K), 38.4 Kbps, 19.2 Kbps, 9.6 Kbps, 4.8 Kbps and 2.4 Kbps.

SUMMARY OF THE INVENTION

In accordance with the present invention, this potential problem is successfully addressed by defining the remote provisioning protocol to include a delimiter byte inserted between successive ones of repeated bytes that make up command and response code sequences between the test system controller and the loop terminating NEI device. Similar to the scheme described in the above-referenced Killian patents, the control link establishment sequence comprises a prescribed set of digital code bytes, including those for a latching loopback condition of a channel unit. The control link establishment code sequence according to the present invention is the code or byte set: a transition in progress (TIP) code; a prescribed loopback select code, termed simply a select code (SC), which is exclusive of those codes currently employed to represent functional operations that are executable by a channel unit; a loopback enable (LBE) code, and a far end voice (FEV) code.

Also, unlike the code sequence described in the Killian patents, there is no code conversion by an intervening channel unit, and the transparent mode is not used. Instead, when an intervening channel unit sees the select code (SC), it simply ignores the message; this ensures that the link establishment message is conveyed all the way to the destination DDST.

When the NEI/DDST detects the 'link establishment' code sequence, it transitions to the command-response mode, so that an 'active session' of exchanging messages with the test system controller may be conducted. During this active session, all command—response messages are formed of the four code set: Start-Of-Message (SOM), Command Type (CT), operational parameter codes (DATA), and End-Of-Message (EOM). In order to provide for byte alignment, each of these respectively different code bytes is repeatedly transmitted a plurality of times, and a 'delimiter' byte is interleaved with or alternates between successively repeated ones of the same code byte. Transmitting the same code byte in an alternating manner with the delimiter byte continues until proper response codes are returned from the NEI device. All response messages from the NEI device are also in the form of code repeats each of which is separated by interleaved delimiter bytes.

DETAILED DESCRIPTION

Before describing in detail the remote NEI device/DDSt unit provisioning mechanism in accordance with the present invention, it should be observed that the invention resides primarily in what is effectively a prescribed communication protocol and an augmentation of the control software employed by the micro-controllers within digital signaling/interface units of the type detailed in the assignee's above-referenced patent applications, that permit a test system controller to establish a control link with and exchange command response messages with a digital data service channel unit.

The digital signaling/interface units may typically comprise modular arrangements of conventional digital communication circuits and associated digital signal processing components and attendant supervisory control circuitry therefor, that controls the operations of such circuits and components. In a practical implementation that facilitates their incorporation into a telecommunication equipment shelf, these modular arrangements may be readily implemented as field programmable gate array (FPGA)—implemented, or application specific integrated circuit (ASIC) chip sets.

Consequently, the configuration of these units and the manner in which they are interfaced with other communication equipment have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

Figure 1:
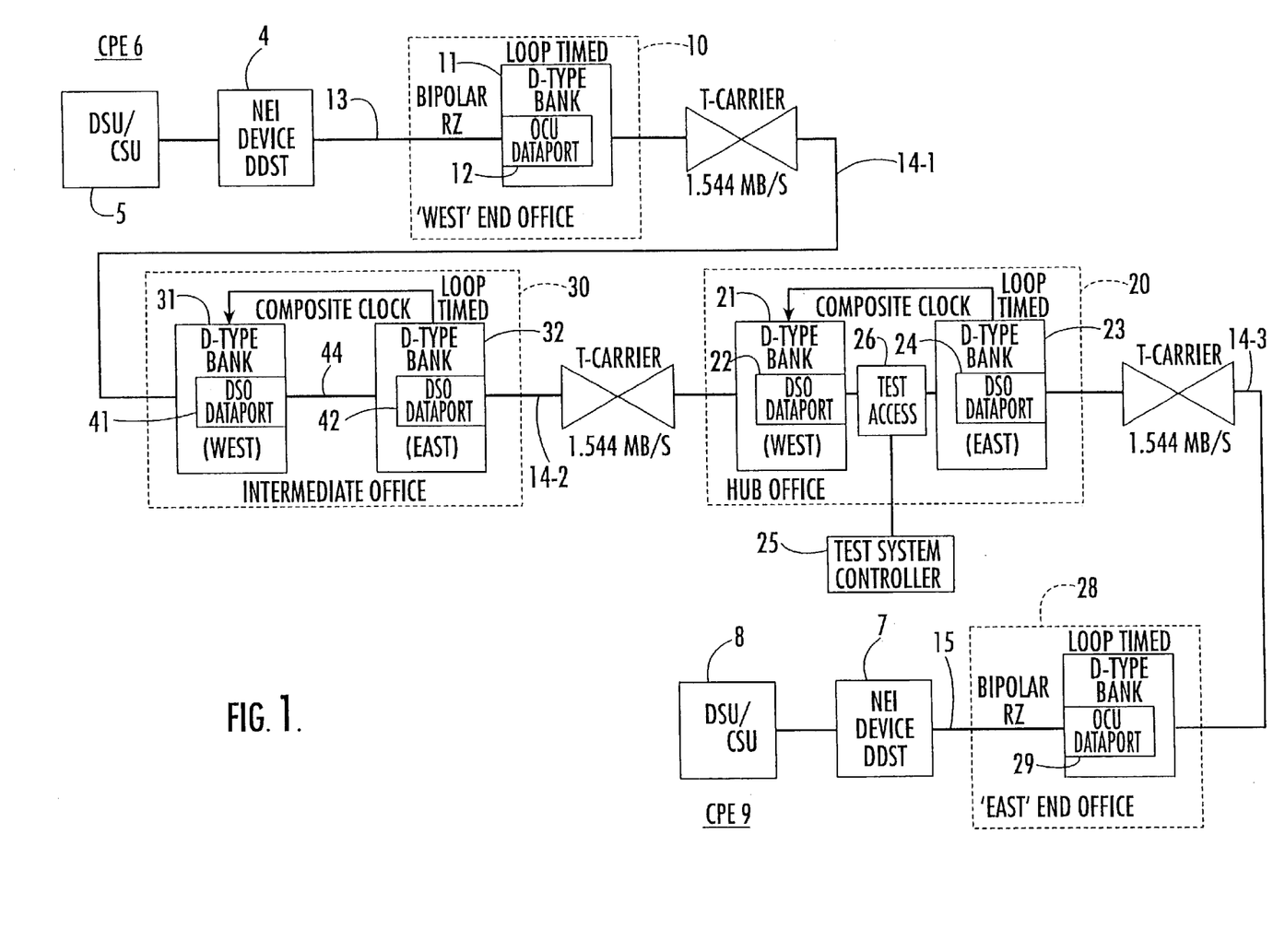
FIG. 1 diagrammatically illustrates a simplified example of a representative digital carrier telephone network in which the remote NEI/DDST unit provisioning mechanism of the present invention may be employed.

FIG. 1 diagrammatically illustrates a simplified example of a representative digital carrier telephone network of the type described in the above-reference Killian et al patents, in which the remote provisioning mechanism of the present invention is intended to be used. Similar to FIG. 1 of each of the Killian et al patents, the network proper is shown as comprising a first 'west' end office 10, having a loop-timed D-type channel bank 11 (such as a D4 channel bank) containing an office channel unit data port (OCU-DP) 12, such as that described in the U.S. Patents to C. Hall et al, U.S. Pat. Nos. 5,473,665 and 5,661,778, assigned to the assignee of the present application and the disclosures of which are incorporated herein. The OCU-DP interfaces bipolar RZ signals over a local DDS loop (e.g., four-wire metallic link) 13. The local DDS loop 13 is terminated by an NEI DEVICE DDST unit 4, which is coupled to a data service unit/channel service unit (CSU/DSU) 5 located at a customer premises (CPE) 6. As a non-limiting example, the DDST unit 4, and also that shown at 7, may be of the type described in the above-referenced Hall et al patents.

On the network side, the OCU-DP 12 is coupled with a digital communication link 14, such as a Ti (1.544 Mb/s) link, F SLY through respective T-Carrier portions 14-1, 14-2 of which frames of DS1 digital data are carried between 'west' end office 10 and a hub office 20, located at an 'east' end of the network. The east end hub office 20 also has a looptimed D-type channel bank 21 (such as a D4 channel bank) containing a DS0 data port 22 of the type described in the above referenced Hall patents. The DS0 data port 22 interfaces DS0 signals carried by a four-wire link 23, which is coupled to analog, digital communication equipment served by the network, with the DS1 signal format carried by the Ti digital communication link 14. A composite clock is coupled from D-type channel bank 23 to D-type channel 21.$_{13}$ The hub office 20 may be further connected via Tl carrier link portion 14-3 to another end office, shown in dotted lines 28, containing an OCU-DP 29 for servicing customer premises equipment at an 'eastwardmost' end of the network. As in the case of the 'west' end office, the OCU-DP 29 interfaces bipolar RZ signals over a local DDS loop (e.g., four-wire metallic link)15, and terminated by DDST unit 7, which is coupled to a CSU/DSU 8 at customer premises 9. A test access 26 between channel banks 21 and 23 is coupled to a test system controller 25.

One or more intermediate offices, a single intermediate office being shown at 30, may be interposed in tandem within T1 digital link 14, between the west end office 10 and east hub office 20. The intermediate office 30 has 'west' and 'east' data ports 31 and 32 coupled to respective portions of T1 digital link 14. An intra-office cross connect (typically on the order of 1500 feet of communication cable) between data ports 31 and 32 of intermediate central office 30 (with a composite clock coupled from D-type channel bank 32 to D-type channel bank 31) is formed of a four-wire transmit/receive pair 44, opposite ends of which are ported to respective 'west' and 'east' tandem DS0 channel units 41 and 42 in the manner described in the Hall et al patents. As described therein, each of digital tandem-connected DS0 channel units 41, 42 is ported to interface frames of DS1 data on Ti link 14 and corresponding frames of DS0 data of the four-wire intra-office digital T/R link 44 through which the digital tandem channel unit pair 41-42 is linked across the intermediate office 30.

As is described in the above referenced Killian et al and Hall et al patents, each digital channel unit, whether it be an OCU dataport channel unit, such as unit 12 resident in 'west' end office 10, or a DS0 dataport channel unit, such as those resident in 'east' end office 20 and intermediate office 30, includes transmit and receive buffers associated with the (bipolar/DS1/DS0) ports. of that unit. These buffers are controlled by a resident micro-controller for interfacing DS1 formatted data traffic from the network (Ti link) side of the unit, retiming the traffic as a DS0 data stream (in the case of a DS0 data port) or a bipolar data stream (in the case of an OCU data port) for transmission from the channel unit, and reconverting bipolar signals (in the case of an OCU data port) or DS0 data frames (in the case of a DS0 data port) into DS1 data frames for transmission over Ti link 14. In addition, controllably enabled loopback paths are provided between the DS1 and bipolar/DS0 ports of a channel unit, so as to permit a channel loopback either at the network side of the unit or at the customer/drop side of the unit.

For purposes of facilitating the present description, the remote DDST provisioning mechanism of the invention will be detailed with reference to the DDST unit 4 terminating the DDS loop 13 at the 'west' end office 10. Since the present invention resides essentially in an enhancement to the control software employed by the various channel unit and DDST unit micro-controllers, these components will be described in only a general sense. Where details of their internal circuitry are desired, attention may be directed to the above-referenced Killian et al and Hall et al patents, to the equipments themselves, and information supplied by their manufacturers. Instead, the following description will set forth the enhancement to the control mechanisms resident within the units micro-controllers and the remote provisioning communication protocol employed that enables a DDST (here DDST 4 at the west end of the network) to be interrogated by and respond to command messages issued by the test system controller 25 coupled to the hub office 20.

Figure 2:
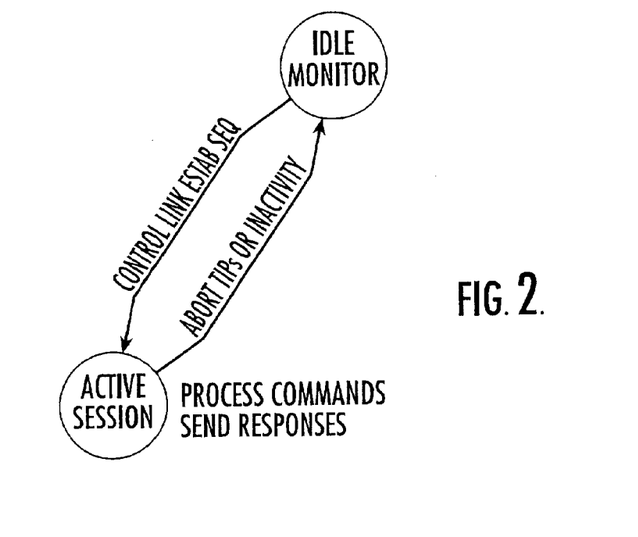
FIG. 2 is a general state diagram of the remote NEI/DDST unit provisioning mechanism in accordance with the present invention.

As pointed out briefly above and as diagrammatically illustrated in the state diagram of FIG. 2, the remote DDST provisioning mechanism in accordance with the present invention comprises two sequential phases or modes. During the first mode a 'control link establishment' sequence, comprised of a set of predefined code bytes, is transmitted from the interrogating test system controller toward the destination DDST unit. When received by the destination DDST unit, the control link establishment sequence will cause the DDST unit to transition from its IDLE MONITOR mode to an ACTIVE SESSION mode. The unit transitions from an ACTIVE SESSION mode to IDLE MONITOR mode for ABORT TRANSITION IN PROGRESS (TIPS) or INACTIVITY.

As described briefly above, the byte contents of the link establishment sequence are defined such that any intervining channel units located between the test system controller and the DDST unit will ignore the control like is establishment sequence whereby an uninterrupted virtual control link is established from the test system controller through one or more intervening channel units to the destination DDST unit. During the ensuing 'active session' mode, command and response messages are exchanged between the test system controller and the selected DDST unit.

CONTROL LINK ESTABLISHMENT MODE

Figure 3:
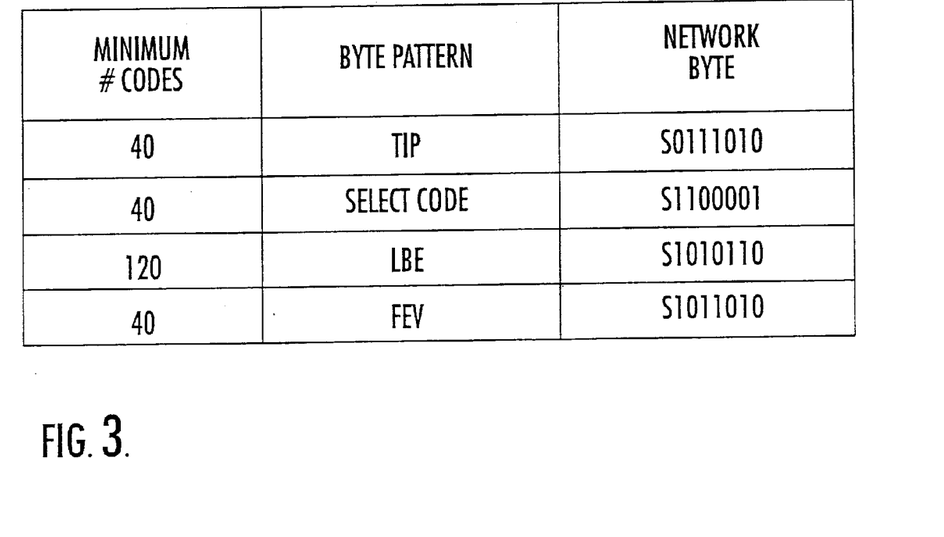
FIG. 3 shows the individual code bytes of a TSC—NEI/DDST unit link establishment sequence.

As noted previously, similar to the technique described in the above-referenced Killian et al patents, the control code sequence that is transmitted from the TSC to the DDST during the control link establishment mode comprises a modified sequence of repetitively transmitted in-band digital code bytes customarily employed for effecting a latching loopback condition. Pursuant to the invention, the individual code bytes that are repetitively transmitted a plurality of times or a minimum number of (#) codes (e.g., forty (40) times) to form a link establishment sequence are shown in FIG. 3. In the listed codes, dual binary coded decimal or hexidecimal notation is used.

Thus, the first code or network byte, a transition in progress (TIP) byte=S0111010, may be denoted as S3A. This is followed by a prescribed select code (SC) byte pattern=S1100001 (or S61), that is defined so to be exclusive of those codes currently employed to represent functional operations to be executed by one or more channel units. As pointed out above, this ensures that the link establishment message will be ignored by any intermediate data port units, and conveyed all the way to the destination DDST. The next byte of the sequence—a loopback enable (LBE) code byte= S1010110 (or S56) transmitted 120 times, is followed by a far end voice (FEV) code byte=S1011010 (or S5A). Within each respective code byte, S is a network framing bit (if applicable) or a don't care bit.

Figure 4:
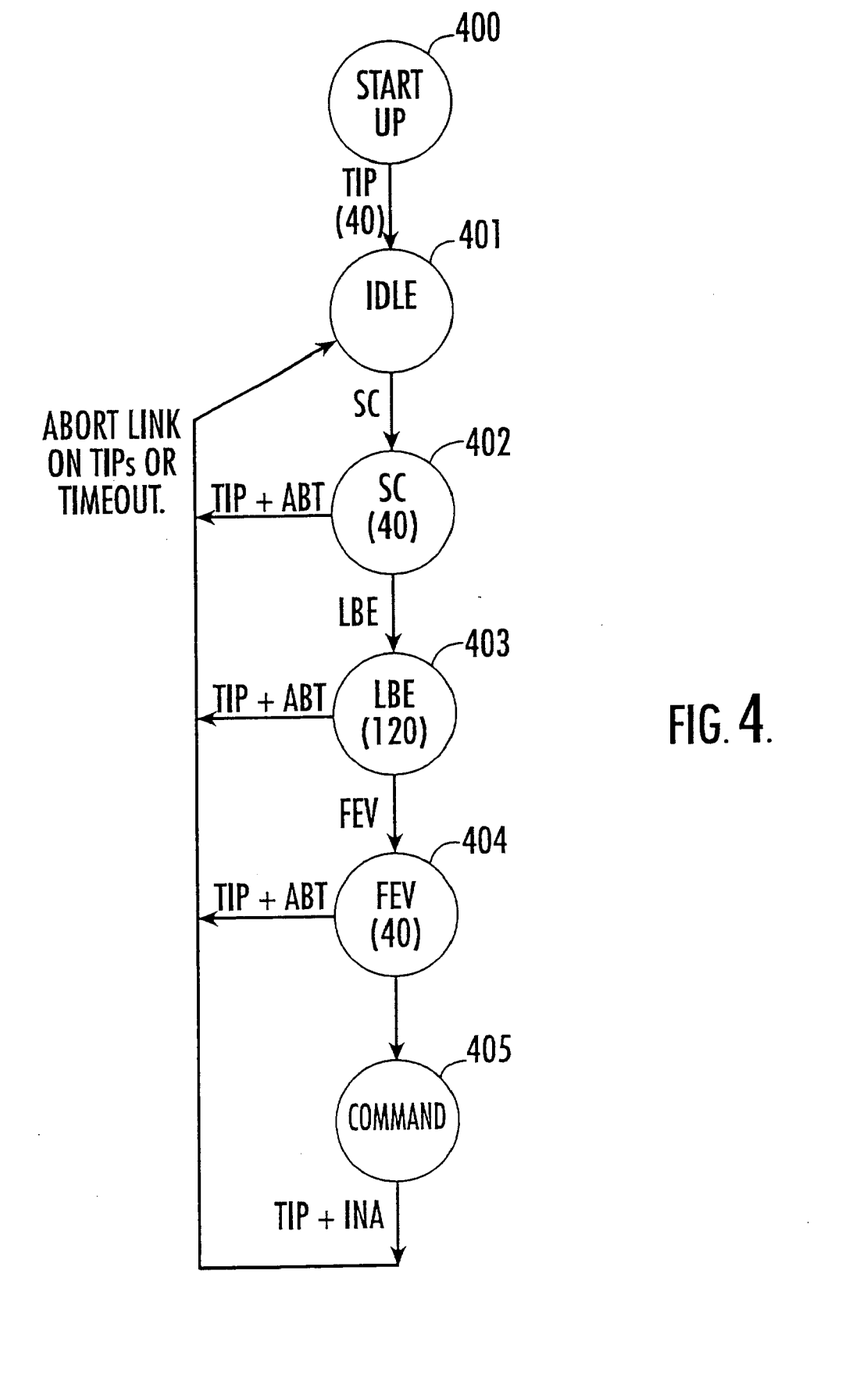
FIG. 4 is a state diagram of the operation of a NEI/DDST unit in the course of the execution of the remote NEI/DDST unit provisioning mechanism of the present invention.

As shown in the state diagram of FIG. 4, when a DDST unit is placed in service (START UP state 400), it monitors the link for the transmission of a TIP code byte sequence (40 bytes) from the test system controller. As TIP code bytes are transmitted they are continuously forwarded by the various intermediate channel units to the downstream end of the link. When the DDST has detected a valid TIP code byte sequence (namely, successfully detected M-out-of-N, e.g. 31 out of 32 code repeats from the TSC), it transitions to an IDLE state 401 and begins looking for the next code in its link establishment sequence. As in the procedure described in the Killian et al patents, if the DDST fails to verify reception of the requisite number of error free TIP code bytes, it maintains its START UP state 400.

In the case of using the scheme described in the Killian et al patent to access a channel.unit intermediate the TSC and the DDST, the next code in the sequence would comprise a sequence of ADC bytes. However, for accessing the DDST terminating the DDS loop in accordance with the present invention, rather than being followed by an ADC code byte, a repetitive sequence (40) of the SC bytes (FIG. 3) is transmitted by the TSC. As noted above, the select code (SC) employed by the present invention is defined so as to be exclusive of those codes currently employed to represent functional operations to be executed by one or more channel units, so that the link establishment message is ignored by the communication control software employed by the intermediate DS0 and OCU data port units. The intermediate channel units remain idle and forward the SC bytes and subsequent components of the link establishment sequence to the terminating destination DDST.

Upon completion of the transmission of the requisite number (40 ) of consecutive TIP code bytes, test system controller 25 transmits the next code byte of the DDST control link establishment sequence—the SC code byte sequence. Upon detecting a valid number of M-out-of-N SC codes in the SC code byte sequence, the DDST transitions from its IDLE state 401 to its SC state 402. Following the transmission of the SC code byte, test system controller 25 proceeds to transmit an LBE code byte sequence. When the DDST detects a valid LBE byte sequence (again using an M-out-of-N comparison to validate the byte), it transitions from the SC state 402 to the LBE state 403.

In the LBE state 403 the DDST begins looking for the final byte (the far end voice code byte FEV) in the control establishment sequence from the test system controller 25. Upon detecting a valid FEV code byte, the DDST transitions to state 404. In this state the destination channel unit is ready to receive command messages from the test system controller. In accordance with the control link establishment protocol of the present invention, the DDST unit the FEV code bytes back to the test system controller, which allows the controller to confirm establishment of the control link. This completes the control link establishment phase.

Until the control link or channel is terminated (TIP+ABT) by the test system controller (by transmitting a TIP code) or aborted (ABT) for lack of activity (e.g. a twenty minute time-out), shown as ABORT LINK ON TIPs OR TIMEOUT) the DDST unit begins looking for command messages from the test system controller during the second phase of operation of the link. Upon receipt of command messages (state 405), the DDST unit transmits response messages back to the test system controller until the link is terminated (TIP+INA). As will be described in detail below, during this command-response phase, the test system controller sends commands, followed by optional parameter data, and receives response messages from the DDST unit, until it terminates the control link by transmitting a TIP code or ceases transmitting command messages to the DDST unit for a prescribed length of time, in response to which the DDST unit returns to normal operation.

COMMAND-RESPONSE MODE

COMMAND MESSAGE

Similar to the command message format employed in the above-referenced Killian et al patent, a command message sourced from the test system controller comprises a multi-byte field sequence comprised of: 1—a Start-Of-Message (SOM) field; 2—a Command Type (CT) field; 3—one or more optional parameter (DATA) code bytes that make up a parameter field; and 4—an End-Of-Message (EOM) field. However, as discussed previously, since the channel unit being accessed is a DDST terminating a local DDS loop, there is a potential problem in determining proper byte alignment for the remote provisioning protocol employed for various violation mode rates, including, for example, 56 Kbps, 38.4 Kbps, 19.2 Kbps, 9.6 Kbps, 4.8 Kbps and 2.4 Kbps.

Figure 5:
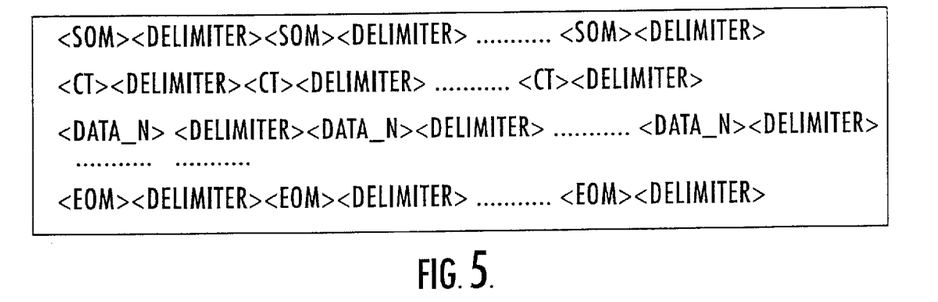
FIG. 5 shows the format of a command message containing interleaved delimiter bytes sourced from a test system controller.

This byte alignment problem is solved in accordance with the present invention by interleaving a delimiter byte between successively transmitted ones of the code bytes of a command—response message session. FIG. 5 diagrammatically illustrates delimiter byte interleaving in the downstream direction of a command message from the TSC to the DDST, wherein each of the respectively different code bytes (SOM—CT—DATA_N—EOM) is repeatedly transmitted a plurality of times, and a 'delimiter' byte (DELIMITER) is interleaved with or alternates between successively repeated ones of the same code byte. Transmitting the same code byte in an alternating manner with the delimiter byte continues until proper response codes are returned from the DDST unit.

Likewise, all response messages from the DDST unit in the upstream direction to the TSC are in the form of code repeats, each of which is separated by the interleaved byte (DELIMITER). As in the case of the link establishment sequence code bytes, to prevent erroneous detection of a command code byte, each of the command code bytes is transmitted repetitively for a minimum of a prescribed number of bytes (e.g. 40 consecutive bytes) and verified by the DDST unit performing an M-out-of-N comparison (e.g. 31 out of 32).

The test system controller continues to send each respective COMMAND code byte (and the interleaved DELIMITER code byte) after it has transmitted this minimum number, until the DDST unit responds with a correct next sequence bit (NSB) to be described below, or until a preset time interval has elapsed without a response (e.g. a twenty minute timeout). The DDST unit acknowledges and responds to a valid command message by sending a response message back to the test system controller. If a command message contains invalid command field or parameter data, the DDST unit transmits an error response code. Should no valid response code be returned from the DDST unit to the TSC prior to the expiration of the timeout, the test system controller begins error recovery, preferably by retransmission of the command message. If repeated retransmission is unsuccessful after a predetermined number of retransmissions (e.g. three attempts), the test system controller transmits a TIP code byte to terminate the control link.

As tabulated below in a non-limiting example of a typical command—response message sequence between the TSC and the DDST, each of the start of message code SOM and the end of message code EOM consists of an ALL '1'S code representative of a data mode idle condition. Upon receipt of the ALL '1'S code, the DDST unit will resynchronize its receiver and begin looking for the command field (CT) code. Following the CT code is one or more parameter codes (DATA) associated with the type of command contained in the message. During an interrogation command message, for example, the data within the parameter field will select a specific register in the DDST unit, the contents of which are read out and placed in the parameter field of the response message from the DDST unit. During a provisioning command message, the parameter field DATA contains alternating register address/data bytes for loading configuration information into the DDST unit's configuration registers. For a supervisory command message, the parameter field DATA is used to specify a particular operational mode executed by the DDST unit.

COMMAND-RESPONSE BYTE STRUCTURE

Figure 6:
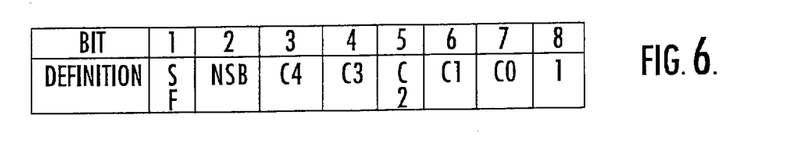
FIG. 6 illustrates the format of a network byte.
Figure 7:
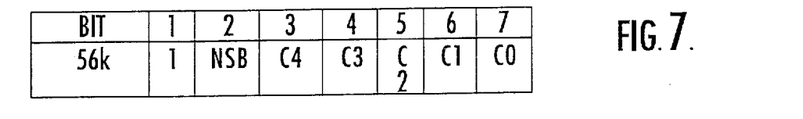
FIG. 7 illustrates the format of a 56K DDS local loop byte.
Figure 8:
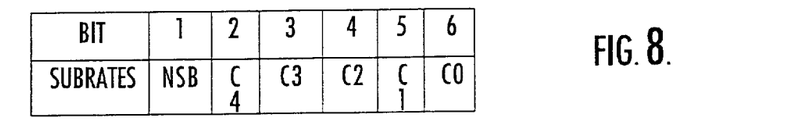
FIG. 8 illustrates the format of a sub-rate DDS local loop byte.

The general format for a network byte is illustrated in FIG. 6, and its corresponding 56K and sub-rate DDS local loop byte structures are respectively shown in FIGS. 7 and 8. Bit 1 of the network byte, the most significant (MSB) and first transmitted bit of the byte, is a DDS sub-rate framing (SF) bit, and is treated as a 'DON'T CARE' bit for a command or parameter byte. The sub-rate framing bit is not used to allow command and response propagation through sub-rate multiplex equipment of the network. The second bit, a next sequence bit (NSB), is employed to properly sequence command and data codes during message transmission. Normally, the NSB alternates between the values 0 and 1 in successive code bytes of a command or response frame. For this purpose, the test system controller preferably maintains a next send variable, which is inserted as the NSB of a transmitted command frame byte. This one bit variable is initialized at 0 at the beginning of a command message frame, and is thereafter incremented modulo-two after the transmission of each code byte.

In FIG. 6, bits 1–8 respectively correspond to SF, NSB, command bits C4, C3, C2, C1, C0 and 1.

In FIG. 7, bits 1–7 respectively correspond to 1, NSB, C4, C3, C2, C1, C0.

In FIG. 8, bits 1–6 respectively correspond to NSB, C4, C3, C2, C1, C0.

In a similar manner the DDST unit maintains a next receive variable which is inserted as the NSB of a response frame data byte. This one bit variable is initialized at 0 at the beginning of a response message frame and is thereafter incremented modulo-two on the reception of each command frame byte. By comparing the received NSB with the NS in the case of the TSC, and NR value, in the case of the DDST unit, the device receiver can detect whether a code byte is a duplicate, invalid or out of sequence.

Bits 3–7 of the network byte contain hexadecimal commands (C4, C3, C2, C1, C0) or data in the range of 00–1D. The value 1F is not used, since it occurs in an ALL '1'S byte. The value 1E is reserved for use as an error response from a channel unit for invalid commands and/or parameter data. Finally, bit 8 is a DDS network control bit, used by the network during normal operation for control and secondary channel data. Bit 8 is always set to the value '1' for command and response messages, in order to minimize potential interference with the operation of other network devices.

Figure 9:
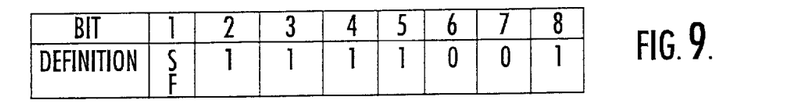
FIG. 9 illustrates the format of a network delimiter byte.
Figure 10:
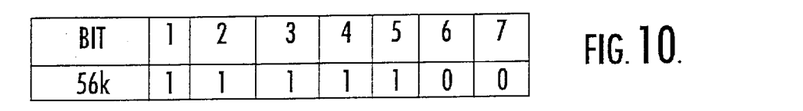
FIG. 10 illustrates the format of a 56K network delimiter byte.
Figure 11:
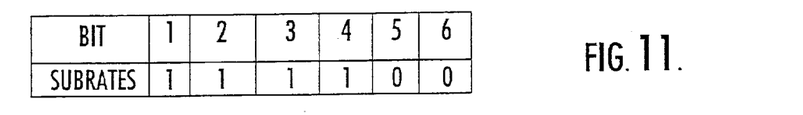
FIG. 11 illustrates the format of a sub-rate network delimiter byte.

The general format for the network delimiter byte (DELIMITER) is illustrated in FIG. 9; its corresponding 56K and sub-rate DDS local loop byte structures are respectively shown in FIGS. 10 and 11.

In FIG. 9, bits 1–8 respectively correspond to SF, 1, 1, 1, 1, 0, 0, 1.

In FIG. 10, bits 1–7 respectively correspond to 1, 1, 1, 1, 1, 0, 0.

In FIG. 11, bits 1–6 respectively correspond to 1, 1, 1, 1, 0, 0.

EXAMPLE

The table 1 below illustrates a typical command—response example of a communication sequence between the test system controller and a DDST unit (NEI device). For sub-rates, the TSC must repeat command bytes accordingly (for example 9.6 k, 4.8 k, 2.4 k are repeated 5, 10 and 20 times respectively).

TABLE 1

| Operation | # Bytes | TSC | DDST | Action |
|---|---|---|---|---|
| Establish ADS-6 Local Loop Control Channel | | | | |
| | 40 | S0111010 | ⇒ | TSC sends TIPs |
| | 40 | S1100001 | ⇒ | TSC sends SC |
| | 120 | S1010110 | ⇒ | TSC sends LBEs |
| | 40 | S1011010 | ⇒ | TSC sends FEVs |
| | | | ⇐ S1011010 | DDST responds w/ FEVs |
| Active ADS-6 Local Loop Control | | | | |

TABLE 1-continued

| Operation | # Bytes | TSC | DDST | Action |
|---|---|---|---|---|
| Channel | | | | |
| Read Device Type | 40 / 40 | S1111111 / DEL | | TSC sends SOM to begin Command |
| | | | ⇐ S1111111 / DEL | DDST responds with SOM |
| | 40 / 40 | S0000001 / DEL | ⇒ | TSC sends Command Type |
| | | | ⇐ S1001001 / DEL | DDST response type = DDST |
| | 40 / 40 | S1111111 / DEL | ⇒ | TSC sends EOM to terminate command message (EOM = SOM) |
| | | | ⇐ S1111111 / DEL | DDST responds with EOM |
| Read Status | 40 / 40 | S0001001 / DEL | ⇒ | TSC sends Command Type |
| | | | ⇐ S1001001 / DEL | DDST sends response |
| | 40 / 40 | S1000001 / DEL | ⇒ | TSC selects register #0 |
| | | | ⇐ S00AAAA1 / DEL | DDST sends AAAA = Reg. #0 data |
| | 40 / 40 | S0000101 / DEL | ⇒ | TSC select Register #2 |
| | | | ⇐ S10BBBB1 / DEL | DDST sends BBBB = Reg. #2 data |
| | | S1111111 / DEL | ⇐ | TSC sends EOM / SOM |
| | | | ⇐ S1111111 / DEL | DDST responds with EOM |
| Write Configuration | 40 / 40 | S0010001 / DEL | ⇒ | TSC sends Command Type |
| | | | ⇐ S1010001 / DEL | DDST sends response |
| | 40 / 40 | S1000001 / DEL | ⇒ | TSC selects config. Reg. #0 for write |
| | | | ⇐ S0000001 / DEL | |
| | 40 / 40 | S00DDDD1 / DEL | | TSC sends write data = DDDD |
| | | | S10DDDD1 / DEL | DDST saves data and sends response |
| | 40 / 40 | S1111111 / DEL | | TSC sends EOM / SOM |
| | | | ⇐ S1111111 / DEL | DDST responds with EOM |
| Read Interval Command | 40 / 40 | S0010101 / DEL | ⇒ | TSC sends Command Type |
| | | | ⇐ S1010101 / DEL | DDST sends response |
| Read Interval Type | 40 / 40 | S1000011 / DEL | ⇒ | TSC selects Interval #1 |
| | | | ⇐ S0000001 / DEL | DDST sends response (All Registers = 0) |
| | 40 / 40 | S1111111 / DEL | ⇒ | TSC sends EOM / SOM |
| | | | ⇐ S1111111 / DEL | DDST responds with EOM |
| Read | 40 | S0010101 | ⇒ | TSC sends |

TABLE 1-continued

| Operation | # Bytes | TSC | DDST | Action |
|---|---|---|---|---|
| Interval Command | / 40 | / DEL | | Command Type |
| | | | ← S1010101 / DEL | DDST sends response |
| Read Interval Type | 40 / 40 | S1000101 / DEL | ⇒ | TSC selects Interval #2 |
| | | | ← S0000101 / DEL | DDST sends response |
| Select Register Number | 40 / 40 | S0000011 / DEL | ⇒ | TSC selects Interval #2, Register 1 for read |
| | | | ← S1000011 / DEL | DDST sends response |
| | 40 / 40 | S1000001 / DEL | ⇒ | TSC selects MSB High nibble |
| | | | ← S00AAAA1 / DEL | DDST sends response |
| | 40 / 40 | S0000011 / DEL | ⇒ | TSC select MSB Low nibble |
| | | | ← S10BBBB1 / DEL | DDST sends response |
| | 40 / 40 | S1000101 / DEL | ⇒ | TSC selects LSB High nibble |
| | | | ← S00CCCC1 / DEL | DDST sends response |
| | 40 / 40 | S0000111 / DEL | ⇒ | TSC selects LSB Low nibble |
| | | | ← S10DDDD1 / DEL | DDST sends response |
| Select Register Number | 40 / 40 | S1000101 / DEL | ⇒ | TSC selects Interval #2, Register 2 for read |
| | | | ← S0000101 / DEL | DDST sends response |
| | 40 / 40 | S0000001 / DEL | ⇒ | TSC selects MSB High nibble |
| | | | ← S10AAAA1 / DEL | DDST sends response |
| | 40 / 40 | S1000011 / DEL | ⇒ | TSC select MSB Low nibble |
| | | | ← S00BBBB1 / DEL | DDST sends response |
| | 40 / 40 | S0000101 / DEL | ⇒ | TSC selects LSB High nibble |
| | | | ← S10CCCC1 / DEL | DDST sends response |
| | 40 / 40 | S1000111 / DEL | ⇒ | TSC selects LSB Low nibble |
| | | | ← S00DDDD1 / DEL | DDST sends response : : : |
| Select Register Number | 40 / 40 | S0011001 / DEL | ⇒ | TSC selects Interval #2, Register 12 for read |
| | | | ← S1011001 / DEL | DDST sends response |
| | 40 / 40 | S1000001 / DEL | ⇒ | TSC selects MSB High nibble |
| | | | ← S00AAAA1 / DEL | DDST sends response |
| | 40 / 40 | S0000011 / DEL | ⇒ | TSC select MSB Low nibble |
| | | | ← S10BBBB1 / DEL | DDST sends response |
| | 40 / 40 | S1000101 / DEL | ⇒ | TSC selects LSB High nibble |
| | | | ← S00CCCC1 / DEL | DDST sends response |
| | 40 / 40 | S0000111 / DEL | ⇒ | TSC selects LSB Low nibble |
| | | | ← S10DDDD1 / DEL | DDST sends response |
| | 40 / 40 | S1111111 / DEL | ⇒ | TSC sends EOM/SOM |
| | | | ← S1111111 / DEL | DDST responds with EOM |
| Terminate ADS-6 Control Link | | | | |
| | 40 | S0111010 | ⇒ | TSC sends TIPs DDST returns to normal operation |

Table 2 lists various types of commands that can be used with the DDST unit. Most of these commands are similar to those listed in the above-referenced Killian et al patents.

TABLE 2

| TYPE | COMMAND | CODE (C4-C0) |
|---|---|---|
| Device Information Commands: | Read Device Type | 00000 |
| | Read Part Number | 00001 |
| | Read Revision Number | 00010 |
| | Read Serial Number | 00011 |
| | Read CLEI Code | 00100 |
| Performance Commands: | Read Status | 00101 |
| | Supervisory Control | 00110 |
| Provisioning Commands: | Read Configuration | 00111 |
| | Write Configuration | 01000 |
| | Write Configuration Bit | 01001 |
| | Error Response Code | 11110 |
| Performance Commands | Read Interval Command | 01010 |

The Performance Command, which is not listed in the Killian et al patent, is set forth below. The Performance Regosters pertaining to the previous 24 hours stored in the DSST may be accessed by using the Read Performance Interval Command described below. The performance registers accessed with this command will be 8 bit or 16 bit wide registers. For clarity, this command was included in the previous example.

| Read Performance Interval Command | | | | | | | | |
|---|---|---|---|---|---|---|---|---|
| bits | | 1 | 2 | 3 | 4 | 5 | 6 | 7 | 8 |
| Read Interval Command: | S | Ns | 0 | 1 | 0 | 1 | 0 | 1 |
| Read Interval Response: | S | Nr | 0 | 1 | 0 | 1 | 0 | 1 |

-continued

Read Performance Interval Command

| bits | 1 | 2 | 3 | 4 | 5 | 6 | 7 | 8 |
|---|---|---|---|---|---|---|---|---|
| Interval Type Command: | S | Ns | S1 | S2 | S3 | S4 | S5 | 1 |
| Interval Type Response: | S | Nr | R1 | R2 | R3 | R4 | R5 | 1 |

Where S1→S5 (01–1B) selects the type of interval to be read.

DDST Example

| S1–S5 | R1–R5 | |
|---|---|---|
| 00001 | 00001 | Network Errored Seconds |
| 00010 | 00010 | Network Unavailable Seconds |
| : | : | |
| 01001 | 01001 | Customer Errored Seconds |
| 01010 | 01010 | Customer Unavailable Seconds |
| : | : | |

If R1–R5=00000, then all corresponding registers in that interval are equal to zero. Therefore, the individual registers will not need to be read and a quicker response to the Read Interval Command is provided.

| Register Number Command: | S | Ns | R1 | R2 | R3 | R4 | R5 | 1 |
|---|---|---|---|---|---|---|---|---|
| Register Number Response: | S | Nr | R1 | R2 | R3 | R4 | R5 | 1 |

Where R1–R5 (01–1B) select the desired register to be read within the specified interval.

| S1–S5 | R1–R5 | |
|---|---|---|
| 00001 | 00001 | Register #1, Corresponding to 0–2 hour interval |
| 00010 | 00010 | Register #2, Corresponding to 2–4 hour interval |
| . | . | |
| . | . | |
| . | . | |
| 01100 | 01100 | Register #12, Corresponding to 22–24 hour interval |
| Nibble Select Command: | S | Ns | 0 | S1 | S2 | S3 | S4 | 1 |
| Nibble Select Response: | S | Nr | 0 | D1 | D2 | D3 | D4 | 1 |

Where S1–S4 select the desired byte/nibble combination to be read.

For 2 byte (16 bit) Registers:

| S1–S4 | D1–D4 |
|---|---|
| 0000 | High nibble of MSB (Bits 15–12) |
| 0001 | Low nibble of MSB (Bits 11–8) |
| 0010 | High nibble of LSB (Bits 7–4) |
| 0011 | Low nibble of LSB (Bits 3–0) |

For 1 byte (8 bit) Registers:

| S1–S4 | D1–D4 |
|---|---|
| 0000 | High nibble (Bits 7–4) |
| 0001 | Low nibble (Bits 3–0) |

DDST Device type information

| Device Type: | 00100 |
|---|---|
| LBE Map Code: | MAP1 |

DDST Provisioning Registers

The configuration registers are accessed using the same command/response byte structure described in the Killian et al patents, but with the addition of the delimiter byte.
Provisioning Register (S1–S5:00000)—Options
    D1—RPLB=Enable/Disable Repeater Loopback (1=Enable)
    D2—REGN=Enable/Disable Regeneration of Network Signal (1=Enable)
    D3—LBO=Enable/Disable Attenuation of Regenerated Signal (1=Enable)
    D4—SX=Normal DDS sealing current operation/Ignore sealing current (1=Normal)
Provisioning Register (S1–S5:00001)—Options
    D1—RPV=Configuration Mode (1=Remote, 0=Local Options)
    D2—=spare
    D3—=spare
    D4—=spare
Bit D1, Configuration Mode, is read only and unaffected by Write Configuration Commands.

DDST Status Registers

The Status Registers are accessed using the same command/response byte structure described in the Killian et al patent, but with the addition of the delimiter byte.
Status Register (S1–S5:00000)—Device
    D1—spare
    D2—SDP=Self-Diagnostics Passed (1=Passed)
    D3—SDF=Self-Diagnostics Failed (1=Passed)
    D4—NWS=New Device State (1=Passed)
Status Register (S1–S5:00001)—Device
    D1—EPF=Non-Volatile Memory Failure (1=Failure)
    D2—CFGI=Configuration Invalid (1=Invalid)
    D3—REV=DSU Pairs reversed or Powered Off (1=True)
    D4—spare
Status Register (S1–S5:00010)—Loop
    D1—NLSC=Network Loop Sealing Current (1=Active)
    D2—NLRS=Network Loop Receive Signal (1=Active)
    D3—CLSC=Customer Loop Sealing Current (1=Active)
    D4—CLRS=Customer Loop Receive Signal (1=Active)
Status Register (S1–S5:00011)—Rate
    D1—R0=SC (1=enabled)
    D2—R1=Rate: (R1,R2,R3)
    D3—R2=000: 56 k 001: 38.4 k D4—R3=010: 19.2 k 011: 9.6 k 100: 4.8 k 101: 2.4 k Status Register (S1–S5:00100)—Network Receive Signal Loss
- D1—NRL7=Receive Signal Loss dB, Upper nibble (NRL7–NRL4)
- D2—NRL6=
- D3—NRL5=
- D4—NRL4=

Status Register (S1–S5:00101)—Network Receive Signal Loss
- D1—NRL3=Receive Signal Loss dB, Lower nibble (NRL3–NRL0)
- D2—NRL2=
- D3—NRL1=
- D4—NRL0=

The Receive Signal Loss is a binary encoded value with the following format:

RL7=0: Loss in dB=value (NRL6–NRL0).
RL7=1: Loss in dB>value (NRL6–NRL0)

This encoding format allows the channel unit to report its value based upon its measurement capability.

Elapsed Minutes Status Register: maintains an elapsed minute accumulator for the most current 2 hour interval.

Elapsed Minutes (S1–S5:00110)
- D1—EM7=Elapsed Minutes, Upper nibble (7-4)
- D2—EM6=
- D3—EM5=
- D4—EM4=

Elapsed Minutes (S1–S5:00111)
- D1—EM3=Elapsed Minutes, Lower nibble (3-0)
- D2—EM2=
- D3—EM1=
- D4—EM0=

DDST Performance Interval Registers

The status registers are accessed using the same command/response byte structure found in the Killian et al patent, but with the addition of the delimiter byte. Each parameter listed below is maintained for each of the previous 24 hours in 2 hour intervals. Network errored seconds are defined as any second in which an illegal bipolar violation occurred.

Network Errored Seconds (S1–S5:00001)
- D1—NES15=Network Errored Seconds, MSB upper nibble (NES15–NES12)
- D2—NES14=
- D3—NES13=
- D4—NES12=

Network Errored Seconds (S1–S5:00001)
- D1—NES11=Network Errored Seconds, MSB upper nibble (NES15 NES8)
- D2—NES10=
- D3—NES9=
- D4—NES8=

Network Errored Seconds (S1–S5:00001)
- D1—NES7=Network Errored Seconds, MSB upper nibble (NES7–NES4)
- D2—NES6=
- D3—NES5=
- D4—NES4=

Network Errored Seconds (S1–S5:00001)
- D1—NES3=Network Errored Seconds, MSB upper nibble (NES3–NES0)
- D2—NES2=
- D3—NES1=
- D4—NES0=

Unavailable seconds will begin accumulating immediately upon loss of sealing current or upon the occurrence of 10 consecutive severely errored seconds. A severely errored second is any second with illegal bipolar violations yielding a bit error rate of 1E-3 or greater. Unavailable seconds will stop accumulating upon the occurrence of 10 consecutive non-severely errored seconds.

Network Unavailable Seconds (S1–S5:00010)
- D1—NUAV15=Network Unavailable Seconds, MSB upper nibble (NUAV15–NUAV12)
- D2—NUAV14=
- D3—NUAV13=
- D4—NUAV12=

Network Unavailable Seconds (S1–S5:00010)
- D1—NUAV11=Network Unavailable Seconds, MSB upper nibble (NUAV11–NUAV8)
- D2—NUAV10=
- D3—NUAV9=
- D4—NUAV8=

Network Unavailable Seconds (S1–S5:00010)
- D1—NUAV7=Network Unavailable Seconds, MSB upper nibble (NUAV7–NUAV4)
- D2—NUAV6=
- D3—NUAV5=
- D4—NUAV4=

Network Unavailable Seconds (S1–S5:00010)
- D1—NUAV3=Network Unavailable Seconds, MSB upper nibble (NUAV3–NUAV0)
- D2—NUAV2=
- D3—NUAV1=
- D4—NUAV0=

Network illegal bipolar violations—an illegal bipolar violation is any violation that is received with no zero bit (ie, two consecutive 1's of the same polarity) or any violation that is received which did not alternate in polarity with respect to the last violation that was received. This count will freeze at a maximum hex code value of FFFF for each interval.

Network Illegal Bipolar Violations (S1–S5:00011)
- D1—NBPV15=Network Illegal Bipolar Violations, MSB upper nibble (NBPV15–NBPV12)
- D2—NBPV14=
- D3—NBPV13=
- D4—NBPV12=

Network Illegal Bipolar Violations (S1–S5:00011)
- D1—NBPV11=Network Illegal Bipolar Violations, MSB upper nibble (NBPV11–NBPV8)
- D2—NBPV10=
- D3—NBPV9=
- D4—NBPV8=

Network Illegal Bipolar Violations (S1–S5:00011)
- D1—NBPV7=Network Illegal Bipolar Violations, LSB upper nibble (NBPV7–NBPV4)
- D2—NBPV6=
- D3—NBPV5=
- D4—NBPV4=

Network Illegal Bipolar Violations (S1–S5:00011)
- D1—NBPV3=Network Illegal Bipolar Violations, MSB upper nibble (NBPV3–NBPV0)

D2—NBPV2=
D3—NBPV1=
D4—NBPV0=

Network frame relay BECNs—maintains counts of valid frames with the BECN bit set. This count will freeze at a maximum value of FF for each interval.

Network Frame Relay BECNs (S1–S5:00100)
D1—NBECN7=Network Frame Relay BECNs, Upper nibble (NBECN7–NBECN4)
D2—NBECN6=
D3—NBECN5=
D4—NBECN4=

Network Frame Relay BECNs (S1–S5:00100)
D1—NBECN3=Network Frame Relay BECNs, Upper nibble (NBECN3–NBECN0)
D2—NBECN2=
D3—NBECN1=
D4—NBECN0=

Network frame relay FECNs—maintains counts of valid frames with the FECN bit set. This count will freeze at a maximum value of FF for each interval.

Network Frame Relay FECNs (S1–S5:00101)
D1—NFECN7=Network Frame Relay FECNs, Upper nibble (NFECN7–NFECN4)
D2—NFECN6=
D3—NFECN5=
D4—NFECN4=

Network Frame Relay FECNs (S1–S5:00101)
D1—NFECN3=Network Frame Relay FECNs, Upper nibble (NFECN3–NFECN0)
D2—NFECN2=
D3—NFECN1=
D4—NFECN0=

Network invalid frame relay frames—maintains count of invalid frame relay frames. This count will freeze at a maximum value of FFFF for each interval.

Network Invalid Frame Relay Frames (S1–S5:00110)
D1—NIFR15=Network Invalid Frames, MSB upper nibble (NIFR15–NIFR12)
D2—NIFR14=
D3—NIFR13=
D4—NIFR12=

Network Invalid Frame Relay Frames (S1–S5:00110)
D1—NIFR11=Network Invalid Frames, MSB upper nibble (NIFR11–NIFR8)
D2—NIFR10=
D3—NIFR9=
D4—NIFR8=

Network Invalid Frame Relay Frames (S1–S5:00110)
D1—NIFR7=Network Invalid Frames, MSB upper nibble (NIFR7–NIFR4)
D2—NIFR6=
D3—NIFR5=
D4—NIFR4=

Network Invalid Frame Relay Frames (S1–S5:00110)
D1—NIFR3=Network Invalid Frames, MSB upper nibble (NIFR3–NIFR0)
D2—NIFR2=
D3—NIFR1=
D4—NIFR0=

Network frame relay percent utilization—maintain the average percent utilization over the DDS channel. Average utilization is calculated by total number of octets received between flags of valid frames divided by the total octets received. This value is stored in a one byte register.

Network Frame Relay Percent Utilization (S1–S5:00111)
D1—NUTL7=Network Frame Relay Percent Utilization, Upper nibble (NUTL7–NUTL4)
D2—NUTL6=
D3—NUTL5=
D4—NUTL4=

Network Frame Relay Percent Utilization (S1–S5:00111)
D1—NUTL3=Network Frame Relay Percent Utilization, Upper nibble (NUTL3–NUTL0)
D2—NUTL2=
D3—NUTL1=
D4—NUTL0=

Accessing customer interval registers—The following data can be obtained from the customer interface in the same manner and format as on the network interface.

a) Customer Errored Seconds (S1–S5:01000)
b) Customer Unavailable Seconds (S1–S5:01001)
c) Customer Illegal Bipolar Violations (S1–S5:01010)
d) Customer Frame Relay BECNs (S1–S5:01011)
e) Customer Frame Relay FECNs (S1–S5:01100)
f) Customer Invalid Frame Relay Frames (S1–S5:01101)
g) Customer Frame Relay Percent Utilization (S1–S5:01110)

As will be appreciated from the foregoing description of the present invention, determining proper byte alignment for remote provisioning protocol employed for various violation mode rates, that may be employed for an NEI device (DDST) accessed by way of a local DDS loop, is readily achieved by inserting a delimiter byte between each of successive ones of repeated bytes that make up command and response code sequences between the test system controller and the DDST. Transmitting the same code byte in an alternating manner with the delimiter byte continues until proper response codes are returned from the NEI device (DDST unit). All response messages from the NEI device are also in the form of code repeats each of which is separated by interleaved delimiter bytes.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A communication method comprising the steps of:
(a) transmitting, from a first communication device at a first site, over a digital communications link, to a second communication device at a second site, a first code sequence of respectively different in-band digital codes, which are operative to establish a digital communication session between said first communication device and said second communication device, and include a code that is exclusive of a code representative of a functional operation to be executed by a channel unit, so that a channel unit between said first and second communication devices will not prevent said second communication device from receiving said first code sequence; and
(b) in response to step (a) having established said digital communication session between said first communication device and said second communication device, transmitting, over said digital communications link from said first communication device to said second communication device, a second code sequence of respectively different in-band digital codes, that are operative to cause said second communication device to perform a prescribed task which, upon being completed, will cause said first communication device to have knowledge of the operational configuration of said second communication device, each respectively different in-band code of said second code sequence being repetitively transmitted a plurality of times in an alternating sequence with a delimiter in-band digital code.

2. A method according to claim 1, wherein said second sequence of respectively different in-band digital codes is effective to interrogate said second communication device.

3. A method according to claim 2, wherein said second sequence of respectively different in-band digital codes is effective to read the operational configuration of said second communication device, and further including the step of (c) transmitting, over said digital communications link from said second communication device to said first communication device, a response message containing a configuration parameter of said second communication device, said response message being in the form of a response digital in-band code that is repetitively transmitted a plurality of times in an alternating sequence with said delimiter in-band digital code.

4. A method according to claim 1, wherein said second sequence of respectively different in-band digital codes is effective to provision said second communication device with one or more operational parameters, or to specify a prescribed operational mode to be executed by said second communication device.

5. A method according to claim 1, wherein said first in-band digital code sequence comprises a transition in progress code, a select code exclusive of a code currently employed to represent a functional operation executed by a channel unit, a loopback enable code and a far end voice code.

6. A method according to claim 5, wherein said select code comprises the byte S1100001.

7. A method according to claim 1, further including the step of (c) transmitting, over said digital communications link from said second communication device to said first communication device, a response message in the form of a digital in-band code that is repetitively transmitted a plurality of times in an alternating sequence with said delimiter in-band digital code.

8. A method according to claim 1, wherein said digital communication link is coupled to a further communication device at an intermediate site between said first and second sites, and wherein said first code sequence of respectively different in-band digital codes is defined so as to be effectively ignored by said further communication device, whereby said digital communication session may be established between said first communication device and said second communication device.

9. A method according to claim 1, further including the step (c) of transmitting over said digital communications link from said second communication device to said first communication device, a response message containing status information representative of an accumulation of monitored communication signalling errors encountered in the course of the operation of said second communication device.

10. For use with a telecommunication network having a communication link containing a digital data services (DDS) loop over which a first in-band digital code sequence is conveyed from a test system controller (TSC) to a network element interface (NEI) device to establish a digital communication session therebetween, a method for enabling byte alignment to be determined during the course of said digital communication session comprising the steps of:

(a) establishing a second code sequence of respectively different in-band digital codes which, when received by said NEI device, are effective to cause said NEI device to perform a prescribed task that will cause said TSC to have knowledge of the operational configuration of said NEI device, and include a code that is exclusive of codes currently employed to represent functional operations to be executed by one or more channel units, so that a channel unit located between said TSC and said NEI device will not prevent said NEI device from receiving said first code sequence; and (b) repetitively transmitting a plurality of times, from said TSC over said communication link containing said DDS loop to said NEI device, each respectively different in-band code of said second code sequence, in an alternating sequence with a delimiter in-band digital code.

11. A method according to claim 10, wherein said second sequence of respectively different in-band digital codes is effective to specify an operational mode to be executed by said NEI device.

12. A method according to claim 10, wherein said second sequence of respectively different in-band digital codes is effective to read the operational configuration of said NEI device, and further including the step of (c) transmitting, over said communication link containing said DDS loop from said NEI device to said TSC, a response message containing a configuration parameter of said NEI device, said response message being in the form of a response digital in-band code that is repetitively transmitted a plurality of times in an alternating sequence with said delimiter in-band digital code.

13. A method according to claim 10, wherein said first in-band digital code sequence comprises a transition in progress code, a select code exclusive of a code currently employed to represent functional operations to be executed by one or more channel units, a loopback enable code and a far end voice code.

14. A method according to claim 13, wherein said select code comprises the byte S1100001.

15. A method according to claim 10, further including the step of (c) transmitting, over said communication link containing said DDS loop from said NEI device to said TSC, a response message in the form of a digital in-band code that is repetitively transmitted a plurality of times in an alternating sequence with said delimiter in-band digital code.

16. A method according to claim 10, wherein said communication link is coupled to a communication device intermediate said TSC and said NEI device, and wherein said first code sequence of respectively different in-band digital codes is defined so as to be effectively ignored by said communication device, whereby said digital communication session may be established between said TSC and said NEI device.

17. A telecommunication network comprising:
   a first communication device coupled to a digital communications link at a first site; and
   a second communication device coupled to said digital communications link at a second site;

said first communication device being operative to transmit a first code sequence of respectively different in-band digital codes, which are effective to establish a digital communication session with said second communication device, and include a code that is exclusive of codes currently employed to represent functional operations to be executed by one or more communication devices located between said first and second communication devices, and to transmit a second code sequence of respectively different in-band digital codes, that are effective to cause said second communication device to perform a prescribed task which, upon being completed, will cause said first communication device to have knowledge of the operational configuration of said second communication device, said first communication device being operative to repeatedly transmit each respectively different in-band code of said second code sequence alternating with a delimiter in-band digital code.

18. A telecommunication network according to claim 17, wherein said second communication device is operative to transmit a response message in the form of a digital in-band code repetitively a plurality of times in an alternating sequence with said delimiter in-band digital code.

19. A telecommunication network according to claim 17, wherein said second sequence of respectively different in-band digital codes is effective to perform one of the following operations:

i—to interrogate said second communication device, ii—provision said second communication device with one or more operational parameters, or iii—specify an operational mode to be executed by said second communication device.

20. A telecommunication network according to claim 17, wherein said first in-band digital code sequence comprises a transition in progress code, a prescribed select code exclusive of codes currently employed to represent functional operations to be executed by one or more communication devices located between said first and second communication devices, a loopback enable code and a far end voice code.

21. A telecommunication network according to claim 20, wherein said prescribed select code comprises the byte S1100001.

22. A telecommunication network according to claim 17, wherein said digital communication link is coupled to a further communication device at an intermediate site between said first and second sites, and wherein said first code sequence of respectively different in-band digital codes is defined so as to be effectively ignored by said further communication device, whereby said digital communication session may be established between said first communication device and said second communication device.

* * * * *

UNITED STATES PATENT AND TRADEMARK OFFICE
CERTIFICATE OF CORRECTION

PATENT NO. : 6,590,870 B1
DATED : July 8, 2003
INVENTOR(S) : Brian G. Mellberg

It is certified that error appears in the above-identified patent and that said Letters Patent is hereby corrected as shown below:

Column 1,
Line 56, delete "Patents" insert -- patents --

Column 2,
Line 12, delete "able transition" insert -- able to transition --

Column 3,
Line 43, delete "DDSt" insert -- DDST --

Column 4,
Lines 32 and 43, delete "Ti" insert -- T1 --
Line 33, delete "FSLY"
Line 45, delete "13"

Column 5,
Lines 3, 14 and 21, delete "Ti" insert -- T1 --
Line 62, delete "sequence" insert -- sequence, --

Column 6,
Line 44, delete "channel.unit" insert -- channel unit --

Column 9,
Lines 2, 4 and 6, delete "CI, CO" insert -- C1, C0 --

Column 10,
Line 7, insert -- → --
Line 34, delete "←" insert -- → --

Column 12,
Line 6, delete "select" insert -- selects --
Line 6, delete "Regosters" insert -- Registers --

Column 13,
Lines 46, 47 and 48, delete ".        ." insert -- :        : --

Column 15,
Line 53, delete "upper" insert -- lower --
Line 54, delete "15" insert -- 11 --
Line 59, delete "MSB" insert -- LSB --
Line 66, delete "MSB upper" insert -- LSB lower --

UNITED STATES PATENT AND TRADEMARK OFFICE
CERTIFICATE OF CORRECTION

PATENT NO.   : 6,590,870 B1
DATED        : July 8, 2003
INVENTOR(S)  : Brian G. Mellberg It is certified that error appears in the above-identified patent and that said Letters Patent is hereby corrected as shown below:

Column 16,
Line 20, delete "upper" insert -- lower --
Lines 26-27, 33-44 and 66-67, delete "MBS upper" insert -- LBS lower --
Line 54, delete "upper" insert -- lower --

Column 17,
Lines 15 and 31, delete "Upper" insert -- Lower --
Line 47, delete "upper" insert -- lower --
Line 54, delete "MSB" insert -- LSB --
Line 61, delete "MSB upper" insert -- LSB lower --

Column 18,
Line 13, delete "Upper" insert -- Lower --

Signed and Sealed this

Twenty-eighth Day of October, 2003

JAMES E. ROGAN
*Director of the United States Patent and Trademark Office*